US012726951B2

(12) United States Patent
Fu et al.

(10) Patent No.: US 12,726,951 B2
(45) Date of Patent: Sep. 1, 2026

(54) COMMUNICATION METHOD, DEVICE, AND STORAGE MEDIUM

(71) Applicant: GUANGDONG OPPO MOBILE TELECOMMUNICATIONS CORP., LTD., Dongguan (CN)

(72) Inventors: Zhe Fu, Dongguan (CN); Yang Xu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 476 days.

(21) Appl. No.: 18/457,013

(22) Filed: Aug. 28, 2023

(65) Prior Publication Data

US 2023/0403684 A1 Dec. 14, 2023

Related U.S. Application Data

(63) Continuation of application No. PCT/CN2021/078651, filed on Mar. 2, 2021.

(51) Int. Cl.

| | |
|---|---|
| ***H04W 72/04*** | (2023.01) |
| ***H04W 8/24*** | (2009.01) |
| ***H04W 72/51*** | (2023.01) |
| ***H04W 76/20*** | (2018.01) |

(52) U.S. Cl.

CPC ............. *H04W 72/04* (2013.01); *H04W 8/24* (2013.01); *H04W 72/51* (2023.01); *H04W 76/20* (2018.02)

(58) Field of Classification Search

CPC ..... H04W 72/04; H04W 72/51; H04W 76/20; H04W 8/24

See application file for complete search history.

(56) References Cited

U.S. PATENT DOCUMENTS

| | | | | |
|---|---|---|---|---|
| 2019/0045574 | A1 | 2/2019 | Feng | |
| 2020/0022083 | A1 | 1/2020 | Jin et al. | |
| 2020/0213992 | A1 | 7/2020 | Hoffmann | |
| 2022/0248271 | A1* | 8/2022 | Liang | H04W 28/24 |
| 2023/0026021 | A1* | 1/2023 | Liang | H04W 36/037 |
| 2023/0189393 | A1* | 6/2023 | Ying | H04W 4/46 370/311 |

FOREIGN PATENT DOCUMENTS

| | | |
|---|---|---|
| CN | 108282286 A | 7/2018 |
| CN | 108632810 A | 10/2018 |

(Continued)

OTHER PUBLICATIONS

3GPP TS 38.321 V16.3.0 (Dec. 2020);3rd Generation Partnership Project;Technical Specification Group Radio Access Network;NR;Medium Access Control (MAC) protocol specification (Release 16), all pages.

(Continued)

*Primary Examiner* — Saad A. Waqas

(74) *Attorney, Agent, or Firm* — Ladas & Parry, LLP

(57) ABSTRACT

A communication method, a communication device, and a storage medium are disclosed. The communication method includes sending, by a terminal device, request information to a network device, wherein the request information is configured to indicate a first transmission requirement, and the request information is access stratum information.

20 Claims, 5 Drawing Sheets

(56) References Cited

FOREIGN PATENT DOCUMENTS

| | | | | |
|---|---|---|---|---|
| CN | 109451543 A | | 3/2019 | |
| CN | 110830161 A | | 2/2020 | |
| CN | 112351403 A | | 2/2021 | |
| EP | 3554157 A1 | | 10/2019 | |
| WO | 2017166140 A1 | | 10/2017 | |
| WO | WO-2022077375 A1 | * | 4/2022 | ............ H04W 72/04 |
| WO | 2022183362 A1 | | 9/2022 | |

OTHER PUBLICATIONS

International Search Report from International Application No. PCT/CN2021/078651, mailed Nov. 19, 2021.

Written Opinion of the International Searching Authority in International Application No. PCT/CN2021/078651 mailed Nov. 19, 2021 with machine English translation provided by foreign counsel and by WIPO.

European Search Report from the corresponding European Patent Application No. 21928453.6, mailed Mar. 5, 2024 (8 pages).

* cited by examiner

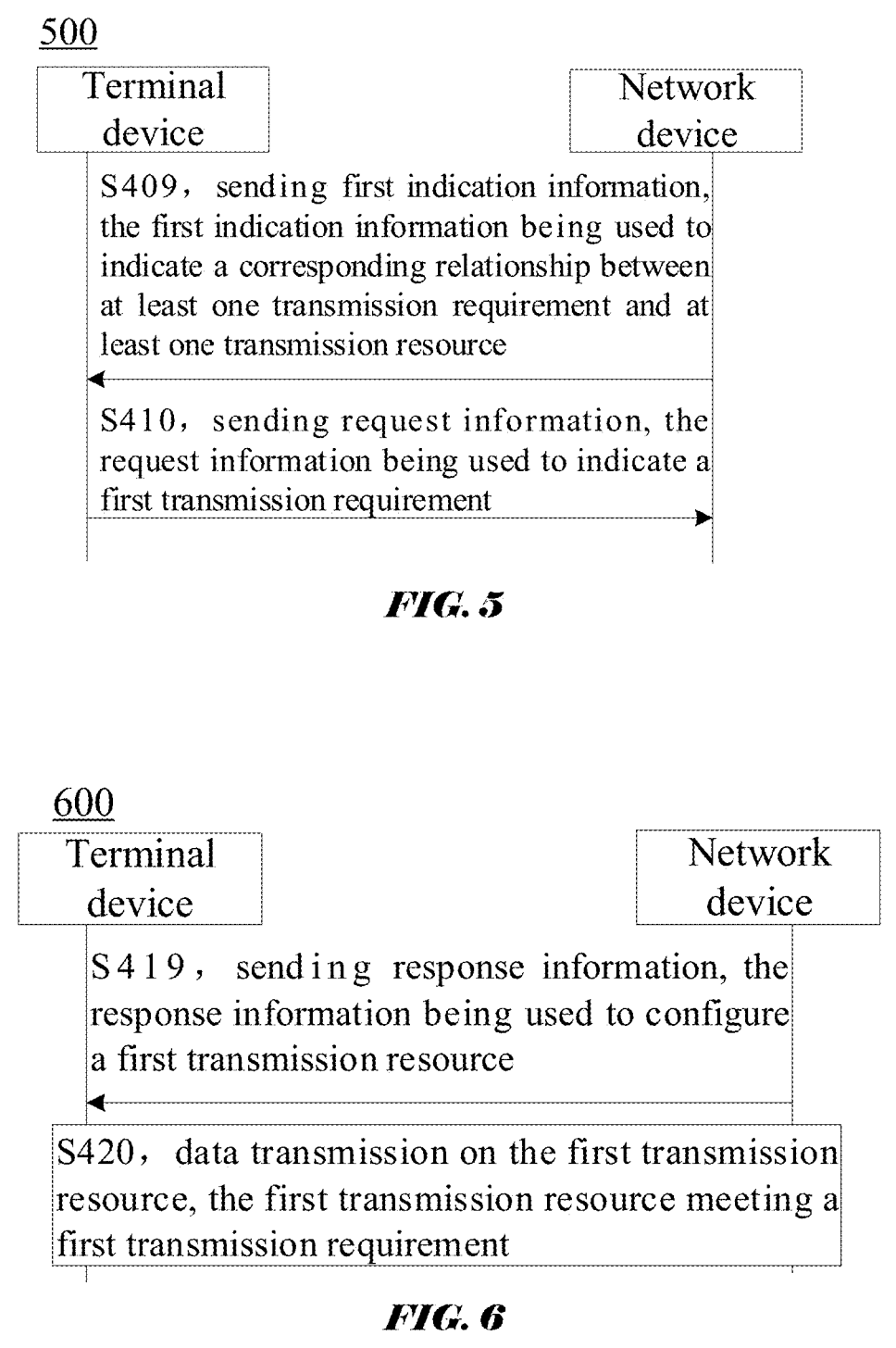

500

Terminal device

Network device

S409, sending first indication information, the first indication information being used to indicate a corresponding relationship between at least one transmission requirement and at least one transmission resource S410, sending request information, the request information being used to indicate a first transmission requirement

Terminal device

Network device

S419, sending response information, the response information being used to configure a first transmission resource S420, data transmission on the first transmission resource, the first transmission resource meeting a first transmission requirement

*FIG. 6*

COMMUNICATION METHOD, DEVICE, AND STORAGE MEDIUM

CROSS REFERENCE

The present disclosure is a continuation-application of International (PCT) Patent Application No. PCT/CN2021/078651, filed on Mar. 2, 2021, the entire contents of which are hereby incorporated by reference in their entirety.

TECHNICAL FIELD

The embodiments of the present disclosure relate to communication technologies, and in particular, to a communication method, a communication device, and a storage medium.

BACKGROUND

With mobile communication systems being applied in various industries, there are higher requirements for transmission quality in mobile communication systems. In some cases, the demand for transmission quality may be temporary. For example, when a user turns on an artificial intelligence (for example, virtual reality (VR), etc.) function of a terminal device, the terminal device suddenly needs a large amount of transmission resources with high transmission quality. Alternatively, in the Industrial Internet of Things, smart terminal devices in factories temporarily perform a production task with high transmission quality requirements. However, in the current mobile communication systems, the network needs a process of modifying a protocol data unit (PDU) session in order to change the quality of transmission resources for the terminal device. This process is time-consuming and not able to meet the above requirements of the terminal device.

SUMMARY OF THE DISCLOSURE

In a first aspect, the embodiments of the present disclosure may provide a communication method. The method includes that: a terminal device sends request information to a network device, wherein the request information is configured to indicate a first transmission requirement and the request information is access stratum information.

In a second aspect, the embodiments of the present disclosure may further provide a communication device. The terminal device includes a processor, a memory, and an interface for communicating with a network device. The memory stores computer-executable instructions when executed by the processor, causing the processor to execute any one communication method in the first aspect.

In a third aspect, the embodiments of the present disclosure provide a non-transitory computer-readable storage medium. The non-transitory computer-readable storage medium stores computer-executable instructions. When the computer-executable instructions are executed by a processor, the computer-readable storage medium is configured to realize any one communication method in the first aspect.

BRIEF DESCRIPTION OF THE DRAWINGS

FIG. 5 is another schematic flowchart of a communication method according to the present disclosure.

FIG. 6 is another schematic flowchart of a communication method according to the present disclosure.

DETAILED DESCRIPTION

In order to describe the purpose, technical solutions and advantages in the embodiments of the disclosure clearly, the technical solutions in embodiments of the present disclosure will be clearly and completely described below in conjunction with the accompanying drawings in the embodiments of the present disclosure, and it is obvious that the described embodiments are only a part of the embodiments of the present disclosure, but not all of them. Based on the embodiments in the present disclosure, all other embodiments obtained by those skilled in the art without creative labor fall within the scope of the present disclosure.

The terms “first”, “second” and the like in the description, claims, and above-mentioned drawings of embodiments of the present disclosure are configured to distinguish similar objects, and are not necessarily configured to describe a specific sequence or sequence. It is to be understood that data used are interchangeable under appropriate circumstances such that the embodiments of the present disclosure described herein, for example, are capable of being practiced in sequences other than those illustrated or described herein. Furthermore, the terms “include” and “have”, and any variations thereof in the embodiments of specification, claims and the figures mentioned above are intended to cover non-exclusive inclusion. For example, a process, method, system, product, or apparatus including a series of steps or units is not limited to the listed steps or units, but alternatively further includes steps or units not listed, or alternatively further includes other steps or units inherent to the process, method, product, or apparatus.

The technical solutions of embodiments of the present disclosure may be applied in various communication systems, for example, a long term evolution (LTE) system, a LTE frequency division duplex (FDD) system, a LTE time division duplex (TDD) system, a universal mobile telecommunications system (UMTS), a worldwide interoperability for microwave access (WiMAX) communication system, a 5th generation (5G) system, or a new radio (NR) and future communication systems, such as the 6th generation mobile communication system, which are not limited in the present disclosure.

Figure 1:
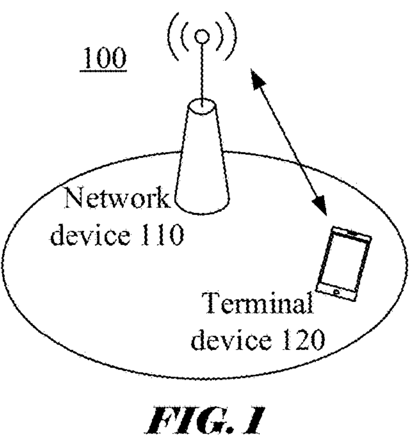
FIG. 1 is a schematic structural diagram of a communication system applicable to the present disclosure.

FIG. 1 is a schematic diagram of a wireless communication system 100 applicable to embodiments of the present disclosure.

As shown in FIG. 1, the wireless communication system 100 may include at least one network device, for example, a network device 110 shown in FIG. 1. The wireless communication system 100 may further include at least one terminal device, for example, a terminal device 120 shown in FIG. 1.

The terminal device in embodiments of the present disclosure may be a user equipment (UE), an access terminal, a subscriber unit, a user station, a mobile station, a mobile platform, a remote station, a remote terminal, a mobile device, a user terminal, a terminal equipment, a wireless communication device, a user agent, or a user apparatus. The terminal device may also be a cellular phone, a cordless phone, a session initiation protocol (SIP) phone, a wireless local loop (WLL) station, a personal digital assistant (PDA), a handheld device with wireless communication function, a computing device or other processing devices connected to wireless modems, a vehicle-mounted device, a wearable device, a terminal device in 5G networks, or terminals in the future evolution of public land mobile network (PLMN), etc., which are not limited in embodiments of the present disclosure.

As an example without limitation, in embodiments of the present disclosure, the terminal device may also be a wearable device. The wearable device may also be called as a wearable smart device, which is a general term of wearable devices intelligently designed and developed from daily wears such as glasses, gloves, watches, clothing, and shoes, with a wearable technology. The wearable device is a portable device which may be worn directly on the body or integrated into the user's clothing or accessories. The wearable device is not only a hardware device, but also may realize powerful functions through software support, data interaction, and cloud interaction. A generalized wearable smart device includes ones with full-featured, large-sized, complete or partial functions without relying on a smart phone, for example, a smart watch or smart glasses, and ones only focused on a certain type of application functions. The generalized wearable smart device needs to be used in conjunction with other devices such as a smart phone, for example, various smart bracelets and smart jewelry for physical sign monitoring.

In addition, in embodiments of the present disclosure, the terminal device may also be a terminal device in the Internet of Things (IoT) system. IoT is an important part in the development of future information technology, and its main technical feature is that items may be connected to the network via a communication technology such that intelligent network is realized with man-machine interconnection and object interconnection.

The network device in embodiments of the present disclosure may be a device for communicating with a terminal device, and the network device may be an access network device in a mobile communication system. For example, the network device may be an evolutional nodeB (or eNB, eNodeB) in an LTE system. The network device may also be a wireless controller in a cloud radio access network (CRAN) scenario, or the network device may be a relay station, an access point, a vehicle-mounted device, and a next generation nodeB (gNB) in a 5G network or a network equipment in a future evolved PLMN network, which are not limited in embodiments of the present disclosure.

The relevant technologies and terms involved in the present disclosure are described below.

Quality of Service (QoS) Flow

A QoS model is based on a QoS flow. The QoS model supports a QoS flow with guaranteed bit rate (GBR) and a QoS flow with non-guaranteed bit rate (Non-GBR). The QoS model also supports a reflective QoS.

The QoS flow is the finest QoS granularity in the protocol data unit (PDU) session. That is, the difference between two PDU sessions lies in different QoS flows (specifically, generally different parameters of QoS flows). A QoS flow identifier (QFI) in the 5G system is configured to identify one QoS flow. User plane data with the same QFI in the PDU session may have the same forwarding processing (such as the same scheduling, the same entry limit). The QFI needs to be unique within a PDU session. That is, a PDU session may have multiple (up to 64) QoS flows, but the QFI of each QoS flow is different (whose value ranges from 0 to 63). QFIs in two PDU sessions of the UE may be repeated. The QFI may be dynamically configured or equal to the 5G QoS identifier (5QI). In the 5G system, QoS flows are controlled by a session management function (SMF) network element, which may be pre-configured or established through a PDU session establishment and modification process.

Figure 2:
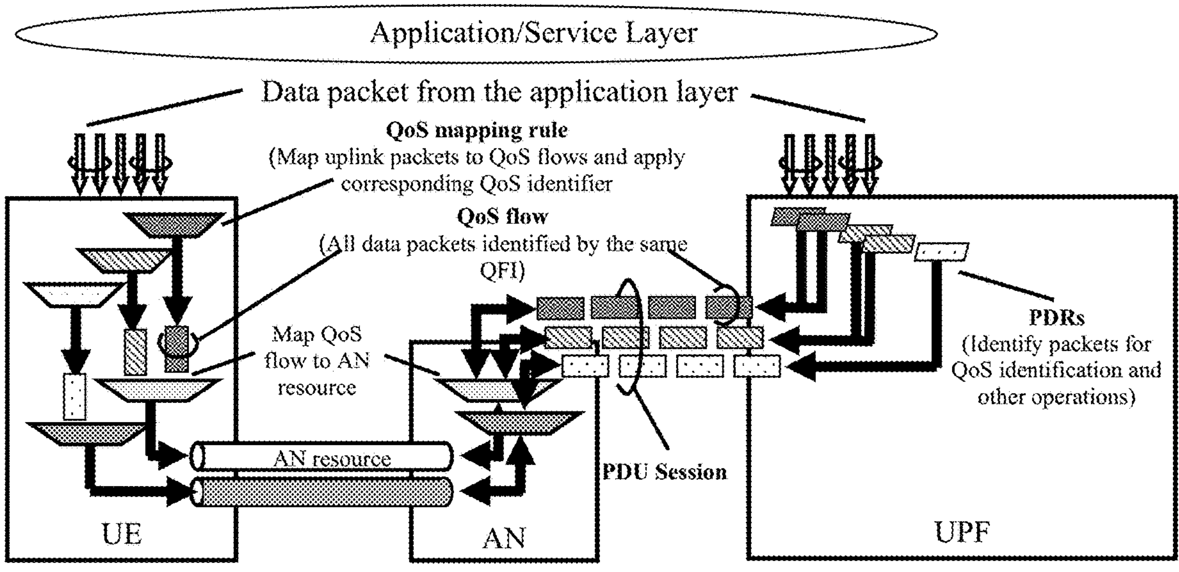
FIG. 2 is a schematic diagram of QoS flow mapping according to the present disclosure.

Characteristics of the QoS flow include a QoS rule at the UE and an uplink and downlink packet detection rule (PDR) at the user plane function (UPF). The QoS rule at the UE is according to the SMF to the UE during the PDU establishment or modification process or derived by the UE through a reflection QoS mechanism. The PDR(s) measured by UPF is configured by SMF. As shown in FIG. 2, in 5GS, a QoS flow associated with a default QoS rule is required in a PDU session, the default QoS flow remains in the entire life cycle of the PDU, and the default QoS flow has to be a Non-GBR QoS flow.

The SMF is responsible for QoS control. When a PDU session is established, the SMF will configure corresponding QoS parameters for the UPF, an access network (AN), and a UE. FIG. 2 shows user plane data classification and identification and rules of mapping QoS flows to AN resources.

For uplink data, the UE matches data packets according to the QoS rules, and the data packets are transmitted upward from the matched QoS flow and its corresponding AN channel (i.e. corresponding resource block (RB)). For downlink data, UPF match data from the application/service layer according to the PDR, and data packets are transmitted from the matched QoS flow and its corresponding AN channel to a terminal device. If a data packet is not matched with any of the QoS rules (uplink) or PDR (downlink), the data packet may be discarded by UE or UPF.

Federated Learning (FL)

Federated learning is a distributed artificial intelligence (AI) training method, in which a training process of the AI algorithm is distributed on multiple devices instead of being aggregated on one server. This may solve problems of time-consuming and large communication overhead resulted from data collection in the centralized AI training. At the same time, since there is no need to send device data to the server, privacy and security issues may also be reduced. The specific process is as follows. The central node sends the AI model to multiple participating nodes, and the participating nodes perform the training of the AI model based on their own data, and report the trained AI model by themselves to the central node in a gradient manner. The central node performs averaging or other operators on gradient information fed back by multiple participating nodes to obtain a new AI model, and sends the new AI model to multiple participating nodes, such that the participating nodes will reperform AI model training. Participating nodes selected by the federated learning each time may be different.

As cameras and sensors on mobile terminal devices have continuously-improved performance, more and more terminal devices may collect valuable training data which is essential for artificial intelligence AI/machine learning (ML) model training. For many AI/ML tasks, small data sample collected by mobile terminal devices is of great significance for training global models. For example, the federated learning may be applied for training of a channel model or training of an environment image model, which is not limited in the present disclosure.

Figure 3:
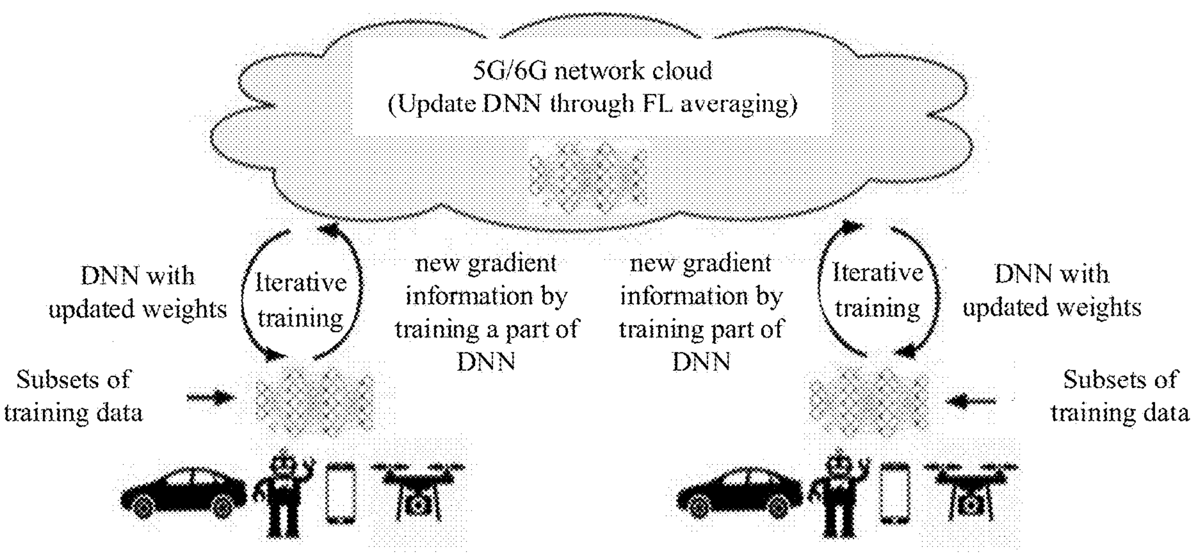
FIG. 3 is a schematic diagram of federated learning performed by a mobile communication system according to the present disclosure.

In the federated learning shown in FIG. 3, a FL server is configured at the network side (for example, the FL server is a 5G or 6G network cloud server), and the FL server may complete training of a global model (for example, the training model may be a deep neural network (DNN) model) by aggregating local training results reported by each terminal. In each training iteration, the terminal device may use local training data to perform training on the global model downloaded from the FL server, and then report an intermediate training result to the FL server through a uplink channel (for example, the intermediate training result may be a gradient of the DNN). The FL server aggregates the collected gradients and updates the global model. The FL server distributes the updated global model to the federated node (i.e. each terminal device) through a downlink channel, and the terminal device performs a next iterative training on this updated model.

For example, Table 1 shows graphics processing unit (GPU) processing times, transmission delays, and transmission rates required for different image batch processing sizes. As shown in Table 1, in one iteration process, the FL server downloads 6.5G-20.3G of model data per second. Similarly, a group of federated nodes upload 6.5G-20.3G of training results to the FL server per second.

TABLE 1

| | | Latency Requirement | | Data rate Requirement | |
|---|---|---|---|---|---|
| Batch processing size (Image) | GPU Processing Time (ms) | Training Gradient Information Uploading (ms) | Federated Model Publishing (ms) | Training Gradient Information Uploading (Gbps) | Federated Model Publishing (Gbps) |
| 64 | 325 | [<162 ms] | [<162 ms] | [6.5] | [6.5] |
| 32 | 191 | [<95 ms] | [<95 ms] | [11.1] | [11.1] |
| 16 | 131 | [<65 ms] | [<65 ms] | [16.2] | [16.2] |
| 8 | 111 | [<55 ms] | [<55 ms] | [19.2] | [19.2] |
| 4 | 105 | [<52 ms] | [<52 ms] | [20.3] | [20.3] |

It may be seen from Table 1, high-quality communication is required between the terminal device and the network to ensure gradient information to be uploaded and model releasing to be timely and accurately exchanged, so as to ensure diversity of data sets and generalization of models. However, the terminal device will upload gradient information to the network device after a period of model training, and the network device will only adjust weights based on gradient information after collecting the gradient information from various federal terminal devices. Therefore, the gradient information uploading and model releasing are infrequent and emergent.

If the network configures continuous resources corresponding to high transmission requirements for the terminal device, the resources may be wasted when data without the high transmission requirement needs to be transmitted. However, in current mobile communication systems, if the transmission requirements need to be adjusted, the network may change quality of transmission resources for the terminal device just with a protocol data unit (PDU) session modification process, which is triggered by a non-access stratum (NAS) process. This process consumes a long time and may not meet needs of the terminal device in a timely manner.

Therefore, the present disclosure proposes that the terminal device sends the request information of the access stratum (AS) layer, and the access network device negotiates with the terminal device to adjust quality of transmission resources of the terminal device, which may reduce time delay for adjusting transmission resources of the terminal device and timely meet transmission requirements of the terminal device.

A communication method according to the present disclosure will be described below with reference to the accompanying drawings.

Figure 4:
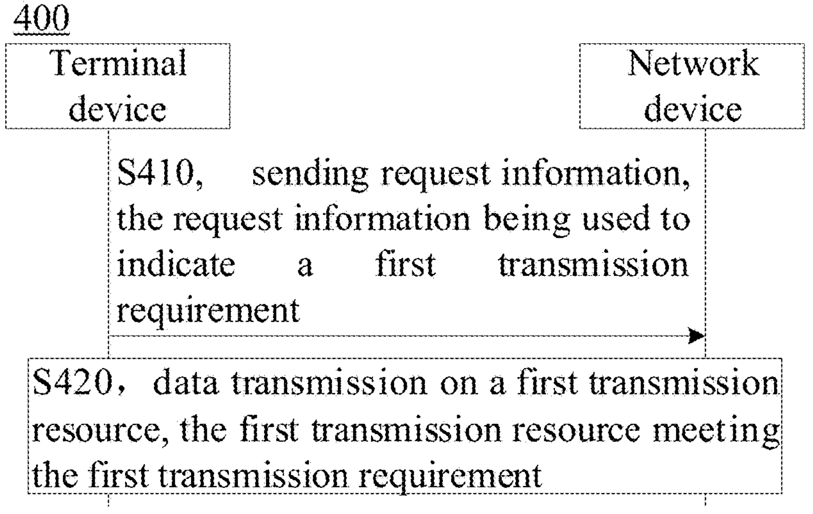
FIG. 4 is a schematic flowchart of a communication method according to the present disclosure.

FIG. 4 is a schematic flowchart of a communication method according to the present disclosure.

At S410, a terminal device sends request information to a network device. The request information is configured to indicate a first transmission requirement.

Correspondingly, the network device receives the request information from the terminal device. The network device is an access network device, and the request information is an AS information. For example, the request information may be carried in at least one of a radio resource control (RRC) message, a medium access control (MAC) control element (CE), a MAC PDU, and physical layer signaling.

The first transmission requirement may correspond to QoS of the NAS layer. Alternatively, the first transmission requirement is a transmission requirement for the AS layer and has nothing to do with the NAS layer. As an example without limitation, the first transmission requirement corresponds to a requirement for a radio bearer (radio bearer, RB), a service requirement, a requirement for a PDU session, a requirement for a QoS flow, or a transmission requirement of the terminal device.

Alternatively, the first transmission requirement is configured to configure, adjust or indicate at least one of: a parameter of a radio bearer, a rate of a data radio bearer (DRB), DRB reliability, a transmission parameter, a parameter of QoS, a parameter of a logical channel (LCH), a transmission delay, and a transmission resource.

Alternatively, the request information is configured to indicate the first transmission requirement. It can be referred that, the request information is used for requesting to adjust a transmission requirement. To adjust the transmission requirement may be to expand the transmission requirement, which is not limited in the present disclosure.

The request information may include, but is not limited to, one or more of: indication information for requesting to change (or adjust, expand) a transmission requirement, the first transmission requirement, identification information of the first transmission requirement, a requirement or configuration information of the first transmission resource, identification information of the first transmission resource, a value of a transmission parameter, a value range of the transmission parameter, and level information of the transmission parameter.

The first transmission resource is a resource meeting the first transmission requirement. The transmission parameter includes one or more of: a rate of a DRB, DRB reliability, and a transmission delay.

The configuration information of the first transmission resource may include, but not limited to, one or more of: starting time, ending time, time domain location information, frequency domain location information, period, an uplink resource, and a downlink resource of the first transmission resource.

The level information of the transmission parameter has a second corresponding relationship with one or more of: one value of the transmission parameter, one value range of the transmission parameter, the first transmission resource, and the identification information of the first transmission resource. And/or, the value of the transmission parameter or the value range of the transmission parameter have a third corresponding relationship with one or more of the first transmission resource and the identification information of the first transmission resource.

Alternatively, the above-mentioned second corresponding relationship and/or the above-mentioned third corresponding relationship may be specified by a protocol or pre-configured for the terminal device by a core-network device or an access network device.

For example, during a establishment/modification process of a PDU session, the core-network device sends a corresponding relationship between a level of the transmission parameter and a value range of the transmission parameter to the terminal device or the access network device (forwarded by the access network device to the terminal device). The terminal device may specifically indicate the level of the transmission parameter that the network device needs to adjust in the request information. For example, a first level of a transmission delay is indicated in the request information, and then the network device determines to adjust the transmission delay with a value range corresponding to the first level after receiving the request information. However, this is not limited in the present disclosure. By indicating the level information, the value range may be avoided to be indicated directly, which reduces signaling overhead and improves signaling reliability.

Alternatively, when a trigger condition is met, the terminal device sends the request information to the network device. The trigger condition includes one or more of: a current transmission resource not meeting the first transmission requirement, a channel condition not meeting the first transmission requirement, a target object not supporting transmission of group data or training data, a variation of a transmission requirement being greater than or equal to a threshold value, and third indication information being received.

The target object is an application layer, an agent, or a target cell, and the third indication information is configured to indicate change of the agent. The agent may be an entity in the network, which is configured to achieve artificial intelligence requirements.

For example, a terminal device belongs to a group of terminal devices (a terminal device may also be referred to as a group). If the terminal device is configured to transmit data (or called as group data) of the group to the network device, but a transmission resource configured for the terminal device by the network does not support group data transmission by the terminal device, or the current transmission requirement does not meet a transmission requirement for group data transmission, the terminal device sends request information to the network device. The request information is configured to indicate the first transmission requirement. However, this is not limited in the present disclosure.

For another example, the terminal device is a participating node (or a federated node) in the federated learning. When the terminal device needs to upload a training result to the network a model training process with a period, but the current transmission resource or transmission requirement configured for the terminal device is not able to meet delay or reliability requirements for transmitting the training result, the terminal device sends the request information to the network device, and the request information is configured to request to adjust the transmission requirement. Alternatively, when the terminal device receives a notification from the network and determines that it needs to receive relevant information about the global model sent by the network device, but the current transmission resource or transmission requirement configured for the terminal device is not able to meet a requirement for receiving the global model, the terminal device may send the request information to the network device to request to adjust the transmission requirement. However, this is not limited in the present disclosure.

For another example, the terminal device is a participating node (or a federated node) in the federated learning. When the terminal device needs to upload a training result to the network after a model training process with a period, but the target agent does not support a collection processing of the training result, the terminal device sends the request information to the network device. The request information is configured to request to adjust the transmission requirement, and is configured to send the training result to a current agent. However, this is not limited in the present disclosure.

In some embodiments, before S410, the network device may send first indication information to the terminal device. The first indication information is configured to indicate a first corresponding relationship between at least one transmission requirement and at least one transmission resource. The terminal device determines the first transmission requirement from at least one transmission requirement. A transmission resource corresponding to the first transmission requirement in the at least one transmission resource is the first transmission resource. In other words, the first transmission resource is a transmission resource that meets the first transmission requirement.

For example, as shown in FIG. 5, before S410, the communication method further includes that the network device sends the first indication information to the terminal device at 409. The first indication information is configured to indicate a corresponding relationship between at least one transmission requirement and at least one transmission resource.

The network device may determine transmission resources corresponding to different requirements based on different requirements, and configure a corresponding relationship between at least one transmission requirement and at least one transmission resource for the terminal device through the first indication information. When the terminal device determines that a trigger condition is met, the terminal device determines the first transmission requirement from at least one transmission requirement, and with the request information, requests the network device that the first transmission resource corresponding to the first transmission requirement is used for data transmission. In other words, the request information may be specifically configured to request the first transmission resource corresponding to the first transmission requirement.

Alternatively, the network device may determine at least one transmission requirement according to information according to the core-network device (for example, SMF). Then, the network device match a transmission resource corresponding to each transmission requirement in the at least one transmission requirement.

In a possible implementation of the present embodiment, after sending the request information, the terminal device may perform data transmission on the first transmission resource at 420.

In other words, when the terminal device determines that the current transmission requirement and/or transmission resource does not meet a condition, the terminal device may select the first transmission requirement indicated by the first indication information or the first transmission resource corresponding to the first transmission requirement, and inform the network device that the first transmission resource is used for data transmission through the request information. Then, the network device and the terminal device may perform data transmission on the first transmission resource.

Alternatively, the first indication information is dedicated information of the terminal device, public information, or dedicated information of a group of terminal devices. The group of terminal devices includes the terminal device.

For example, the group of terminal devices to which the terminal device belongs performs a federated learning task, and the first indication information may be dedicated information of the group of terminal devices. The network device pre-configures a corresponding relationship between transmission requirement(s) and transmission resource(s) for the group of terminal devices, which performs the federated learning task, based on the first indication information. For example, the first indication information may be scrambled by a dedicated radio network temporary identifier (RNTI) for the group of terminal devices. The terminal device in the group of terminal devices may receive the first indication information through the dedicated RNTI, while other terminal devices outside the group of terminal devices are not able to successfully receive the first indication information. However, this is not limited in the present disclosure.

According to the above solution, the terminal device notifies the network device that the terminal device autonomously select the first transmission resource and/or the first transmission requirement from the preconfigured transmission resources and transmission requirements through the request information, which may reduce signaling overhead between the terminal device and the network, reduce time delay in adjusting transmission resources of the terminal device, and timely meet the transmission requirement of the terminal device.

In another possible implementation of the present embodiment, after receiving the request information from the terminal device, the network device sends response information to the terminal device. The response information is configured to confirm that the first transmission resource is configured for data transmission, or the response information is to confirm resource configuration requested by the terminal device. After the network device sends the response information and the terminal device receives the response information, the terminal device and the network device perform data transmission on the first transmission resource.

According to the above solution, after the network device sends the response information for confirming the request of the terminal device, the terminal device and the network device perform data transmission on the first transmission resource. Thus, the terminal device and the network device reaches a consensus, and then a resource meeting the transmission requirement is timely used for data transmission.

In another some embodiments, after receiving the request information from the terminal device, the network device sends response information to the terminal device. The response information is configured to configure the first transmission resource.

After the network device receives the request information, the network device may perform resource configuration or select corresponding requirement configuration according to the received request information. As shown in FIG. 6, the network device sends the response information to the terminal device at S419, and the response information is configured to configure the first transmission resource. After the terminal device receives the response information, the terminal device and the network device may perform data transmission on the first transmission resource at S420.

The response information may include one or more of: time domain location information of the first transmission resource, frequency domain location information of the first transmission resource, LCH parameter, DRB rate, DRB reliability, a value of a transmission delay, a value range of the transmission delay, and level information of the transmission delay.

The transmission delay may be an air interface transmission delay, and/or a core-network transmission delay.

The level information of the transmission delay may correspond to a value range of the transmission delay, and a corresponding relationship between the level information of the transmission delay and the value range may be preconfigured by the network device for the terminal device. However, this is not limited in the present disclosure.

According to the above solution, the network device may configure a corresponding resource that meet the transmission requirement for the terminal device based on the request information of the terminal device, without PDU session modification triggered through the NAS process. Then, the transmission resource or transmission requirement is adjusted for the terminal device. Thus, time delay may be reduced in adjusting the transmission resource of the terminal device and the transmission requirement of the terminal device may be timely met.

Alternatively, the response information may be dedicated information of the terminal device, a public information, or dedicated information of a group of terminal devices to which the terminal device belongs.

Alternatively, the response information sent by the network device may be an RRC message, a MAC CE, or a physical layer signaling in the present disclosure. For example, the response information may be an RRC reconfiguration message, which is not limited in the present disclosure.

As an example without limitation, the first transmission resource may be a physical uplink shared channel (PUSCH) resource, a dynamic grant (DG) resource, a configured grant (CG) resource, an aperiodic resource, a periodic resource, or a semi-persistent resource.

Alternatively, the request information is configured to request a temporary resource, and the first transmission resource is valid for a first time interval. Alternatively, the first transmission requirement is a temporary requirement, and the first transmission requirement is valid for a second time interval.

For example, the request information is configured to indicate to temporarily adjust the transmission requirement. For example, the request information is configured to indicate to temporarily adjust one or more of DRB rate, DRB reliability, and transmission delay.

Alternatively, the request information includes the first time interval or the second time interval, and/or, the first time interval or the second time interval is preconfigured by a core-network device or by the network device.

For example, the request information sent by the terminal device includes a starting time for requesting a temporary resource and the first time interval (or the starting time and ending time). Alternatively, the request information sent by the terminal device includes a starting time for requesting to temporarily adjust a transmission requirement and the second time interval (or the starting time and ending time). The network device may configure corresponding transmission resources for the terminal device based on the request information. However, this is not limited in the present disclosure.

For another example, the response information sent by the network device may include an effective duration of the first transmission resource or the first transmission requirement. Alternatively, the core-network device may send an effective duration of a resource or requirement to the network device in advance during a PDU session establishment/modification process, and then the network device notifies the terminal device.

At S420, the terminal device and the network device perform data transmission on a first transmission resource. The first transmission resource meets the first transmission requirement.

After the terminal device and the network device determine the first transmission resource that meets the first transmission requirement as mentioned above, the terminal device and the network device perform data transmission on the first transmission resource.

The first transmission requirement may be an uplink transmission requirement, and the first transmission resource is an uplink transmission resource. The terminal device sends data to the network device on the first transmission resource at S420, and correspondingly, the network device receives data on the first transmission resource from the terminal device. And/or, the first transmission requirement may be a downlink transmission requirement, and the first transmission resource is a downlink transmission resource. The terminal device receives data from the network device on the first transmission resource at S420, and correspondingly, the network device sends data to the terminal device on the first transmission resource.

According to the present disclosure, the terminal device sends the request information of the AS layer from, and the access network device negotiates with the terminal device to adjust quality of transmission resources of the terminal device, which may reduce time delay for adjusting transmission resources of the terminal device and timely meet transmission requirements of the terminal device.

The communication method according to the present disclosure may also include the following optional implementations.

Alternatively, the terminal device sends second indication information to the network device before S410. The second indication information is configured to indicate capability information of the terminal device or indicate that the terminal device is of a target type.

Correspondingly, the network device receives the second indication information from the terminal device.

As an example without limitation, the capability information of the terminal device includes but is not limited to one or more of: information that the terminal device supports group data transmission, information that the terminal device supports transmission of training data, information that the terminal device supports collection of training data, information that the terminal device supports sending the request information, and information that the terminal device is connected to a target application layer or a target agent.

As an example without limitation, the target type of the terminal device includes, but are not limited to, one or more of: a AI-type terminal device, a terminal device that supports target agents, and a terminal device with training data collection/transmission/processing.

According to the above solution, the network device acquires the capability information of the terminal device and/or the type of the terminal device in advance, and then can configure matched transmission requirement and a transmission resource for the terminal device based on the capability of the terminal device.

Alternatively, the network device may send configuration information to the terminal device according to the second indication information, and the configuration information is configured to configure a resource bearing the request information.

As an example without limitation, the resource configured to bear the request information includes but is not limited to one or more of a Physical uplink control channel (PUCCH) resource, a scheduling request (SR) resource, a CG resource, a random access (RACH) resource (for example, RACH occasion (RO) or preamble), and a MAC PDU.

Alternatively, before the terminal device sends the request information to the network device, the network device sends fourth indication information to the terminal device. The fourth indication information is configured to indicate that the terminal device is allowed or enabled to send the request information.

According to the above solution, the terminal device may send the request information only after the network device allows or enables it to send, making the behavior of the terminal device more controllable, realizing unified scheduling and authorization of wireless resources by the network device, reducing the occurrence of collisions, and then improving communication reliability.

Alternatively, the fourth indication information includes a third time interval, and the third time interval is a minimum time interval for which the terminal device sends the request information indicating the transmission requirement.

The network device may notify the terminal device of the minimum time interval for sending the request information through the fourth indication information, so as to avoid resource waste caused as the terminal device frequently sends the request information.

It should be noted that the communication methods shown in FIG. 4, FIG. 5, and FIG. 6 may be implemented independently or in combination with each other, and the order of the operations is determined by a logical relationship between the operations, and may be adjusted if the logical order is consistent, which is not limited in the present disclosure.

The method according to embodiments of the present disclosure is described above in detail with reference to FIG. 4 to FIG. 6. An apparatus according to embodiments of the present disclosure is introduced below.

Figure 7:
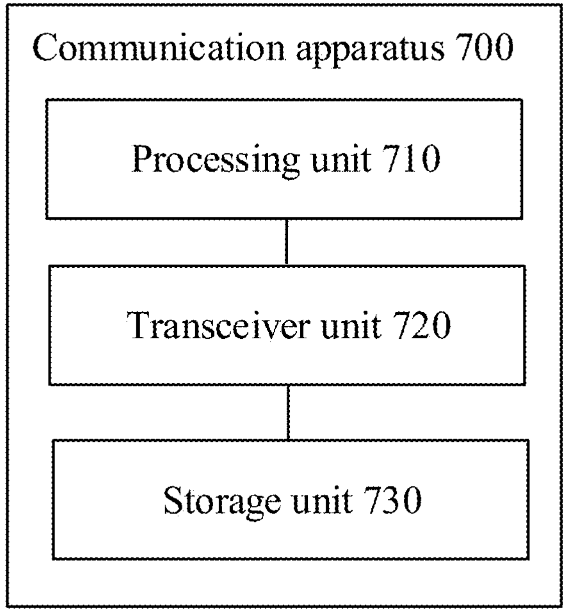
FIG. 7 is a schematic block diagram of a communication apparatus according to the present disclosure.

FIG. 7 is a schematic block diagram of a communication apparatus according to embodiments of the present disclosure. As shown in FIG. 7, the communication apparatus 700 may include a processing unit 710 and a transceiver unit 720.

In a possible design, the communication apparatus 700 may correspond to the terminal device. i.e. UE in the above method embodiments, or configured in (or used in) a chip of the terminal device.

It should be understood that, the communication apparatus 700 may correspond to the terminal device in the method 400, method 500, and method 600 according to embodiments of the present disclosure. The communication apparatus 700 may include units for executing the method 400, method 500 and method 600 performed by the terminal device in FIG. 4, FIG. 5 and FIG. 6. Moreover, various units in the communication apparatus 700 and the above-mentioned other operations and/or functions are configured to achieve a corresponding process of method 400, method 500 and method 600 in FIG. 4, FIG. 5, and FIG. 6 respectively.

It should also be understood that when the communication apparatus 700 is a chip configured in (or used in) the terminal device, the transceiver unit 720 in the communication apparatus 700 may be an input/output interface or a circuit of the chip, and the processing unit 710 in the communication apparatus 700 may be a processor of the chip.

Alternatively, the processing unit 710 of the communication apparatus 700 may be configured to process instructions or data to implement corresponding operations.

Alternatively, the communication apparatus 700 may further include a storage unit 730. The storage unit 730 may be configured to store instructions or data, and the processing unit 710 may execute the instructions or data stored in the storage unit, to enable the communication apparatus to realize corresponding operations. The transceiver unit 720 in the communication apparatus 700 may correspond to a transceiver 810 in the terminal device 800. The storage unit 730 may correspond to a memory in the terminal device 800 shown in FIG. 8.

It should be understood that the specific process for each unit to perform the above corresponding operation has been described in detail in the above method embodiments, and for the sake of brevity, details are not repeated here.

It should also be understood that when the communication apparatus 700 is a terminal device, the transceiver unit 720 in the communication apparatus 700 may be implemented through a communication interface (such as a transceiver or an input/output interface). For example, the transceiver unit 720 may correspond to a transceiver 810 in the terminal device 800 shown in FIG. 8. The processing unit 710 in the communication apparatus 700 may be implemented by at least one processor. For example, the processing unit 710 may correspond to a processor 820 in the terminal device 800 shown in FIG. 8. The processing unit 710 in the communication apparatus 700 may be realized by at least one logic circuit.

In another possible design, the communication apparatus 700 may correspond to the network device in the above method embodiments, or configured in (or used in) a chip of the network device.

It should be understood that, the communication apparatus 700 may correspond to the network device in the method 400, method 500, and method 600 according to embodiments of the present disclosure. The communication apparatus 700 may include units for executing the method 400, method 500 and method 600 performed by the network device in FIG. 4, FIG. 5 and FIG. 6. Moreover, various units in the communication apparatus 700 and the above-mentioned other operations and/or functions are configured to achieve a corresponding process of method 400, method 500 and method 600 in FIG. 4, FIG. 5, and FIG. 6 respectively.

It should also be understood that when the communication apparatus 700 is a chip configured in (or used in) the network device, the transceiver unit 720 in the communication apparatus 700 may be an input/output interface or a circuit of the chip, and the processing unit 710 in the communication apparatus 700 may be a processor of the chip.

Alternatively, the processing unit 710 of the communication apparatus 700 may be configured to process instructions or data to implement corresponding operations.

Alternatively, the communication apparatus 700 may further include a storage unit 730. The storage unit 730 may be configured to store instructions or data, and the processing unit may execute the instructions or data stored in the storage unit 730, to enable the communication apparatus to realize corresponding operations. The storage unit 730 in the communication apparatus 700 may correspond to a memory in the terminal device 900 shown in FIG. 9.

It should be understood that the specific process for each unit to perform the above corresponding operation has been described in detail in the above method embodiments, and for the sake of brevity, details are not repeated here.

It should also be understood that when the communication apparatus 700 is a network device, the transceiver unit 720 in the communication apparatus 700 may be implemented through a communication interface (such as a transceiver or an input/output interface). For example, the transceiver unit 720 may correspond to a transceiver 910 in the terminal device 900 shown in FIG. 9. The processing unit 710 in the communication apparatus 700 may be implemented by at least one processor. For example, the processing unit 710 may correspond to a processor 920 in the terminal device 900 shown in FIG. 9. The processing unit 710 in the communication apparatus 700 may be realized by at least one logic circuit.

Figure 8:
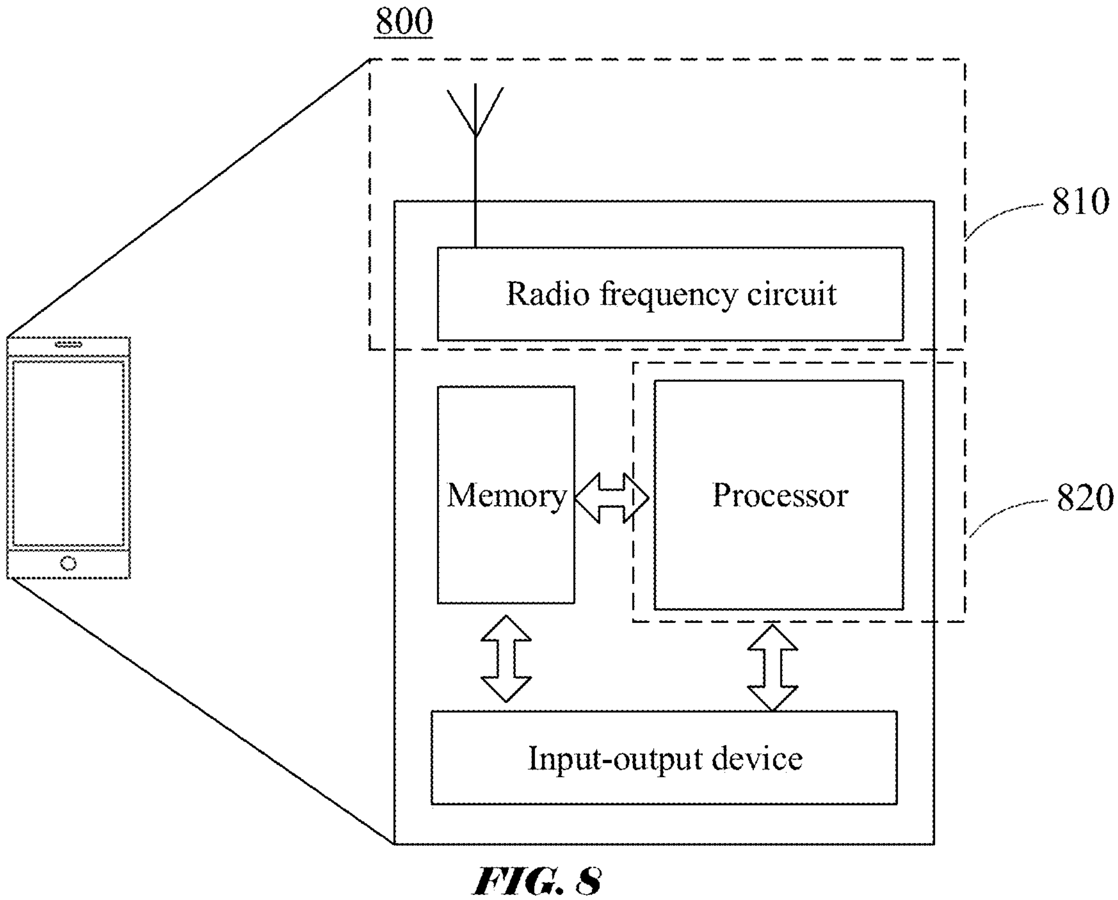
FIG. 8 is a schematic structural diagram of a terminal device according to the present disclosure.

FIG. 8 is a schematic structural diagram of a terminal device 800 according to embodiments of the present disclosure. The terminal device 800 may be applied to a system as shown in FIG. 1 and execute functions of the terminal device in the foregoing method embodiments. As shown in FIG. 8, the terminal device 800 includes a processor 820 and a transceiver 810. Alternatively, the terminal device 800 further includes a memory. The processor 820, the transceiver 810, and the memory may communicate with each other through an internal connection path to transmit control and/or data signals. The memory is configured to store computer programs, and the processor 820 is configured to execute the computer programs in the memory, so as to control the transceiver 810 to send and receive signals.

The processor 820 and the memory may be combined into a processing device, and the processor 820 is configured to execute the program codes stored in the memory to realize the above functions. In a specific implementation, the memory may also be integrated in the processor 820, or be independent from the processor 820. The processor 820 may correspond to the processing unit in FIG. 7.

The above-mentioned transceiver 810 may correspond to the transceiver unit 720 in FIG. 7. The transceiver 810 may include a receiver (or called as a receiving element, a receiving circuit) and a transmitter (or called as a transmitting element, a transmitting circuit). The receiver is configured to receive signals, and the transmitter is configured to transmit signals.

It should be understood that the terminal device 800 shown in FIG. 8 may implement various processes related to the terminal device in embodiments of the method 400, method 500, and method 600 in FIG. 4, FIG. 5, and FIG. 6. The operations and/or functions of various modules in the terminal device 800 are respectively configured to implement a corresponding process in the foregoing method embodiments. Details may be referred to the descriptions in the foregoing method embodiments, and detailed descriptions are appropriately omitted here to avoid repetition.

The above-mentioned processor 820 may be configured to execute actions implemented by the terminal device described in the previous method embodiments, and the transceiver 810 may be configured to execute actions described in the previous method embodiments sent by the terminal device to the network device or actions received from the network device. For details, please refer to the description in the foregoing method embodiments, which are not repeated here.

Alternatively, the terminal device 800 may further include a power supply. The power supply is configured to provide power to various components or circuits in the terminal device.

In addition, in order to improve functions of the terminal device, the terminal device 800 may also include one or more of an input unit, a display unit, an audio circuit, a camera, and a sensor, and the audio circuit may also include a speaker, a microphone, etc.

Figure 9:
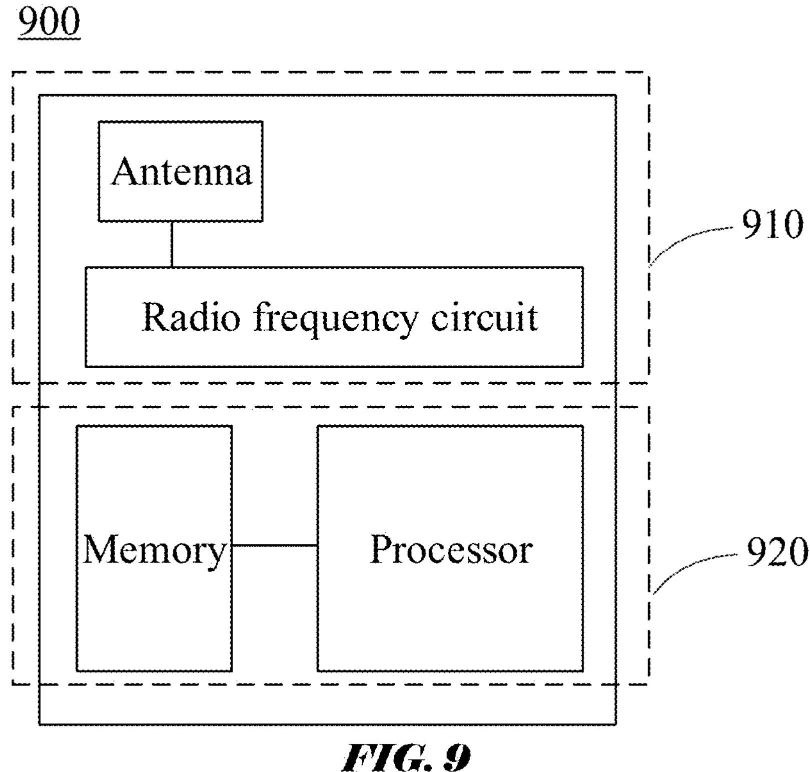
FIG. 9 is a schematic structural diagram of a network device according the present disclosure.

FIG. 9 is a schematic structural diagram of a network device according to embodiments of the present disclosure. The network device 900 may be applied to the system shown in FIG. 1 to execute functions of the network device in the foregoing method embodiments. As shown in FIG. 9, the network device 900 includes a processor 920 and a transceiver 910. Alternatively, the network device 900 further includes a memory. The processor 920, the transceiver 910, and the memory may communicate with each other through an internal connection path to transmit control and/or data signals. The memory is configured to store computer programs, and the processor 920 is configured to execute the computer programs in the memory, so as to enable the transceiver 910 to send and receive signals.

It should be understood that the network device 900 shown in FIG. 9 may realize various processes related to the network device in the method 400, method 500, and method 600 in FIG. 4, FIG. 5, and FIG. 6. The operations and/or functions of various modules in the network device 900 are respectively for implementing a corresponding process in the foregoing method embodiments. Details may be referred to the descriptions in the foregoing method embodiments, which are appropriately omitted here to avoid repetition.

It should be understood that the network device 900 shown in FIG. 9 is only a possible architecture of the network device, and should not be construed as any limitation to the present disclosure. The method according to the present disclosure may be applied to a network device with other architectures, for example, a network device including CU, DU, and AAU. The present disclosure does not limit the specific architecture of the network device.

Embodiments of the present disclosure also provide a processing apparatus. The processing apparatus includes a processor and an interface, and the processor is configured to execute any one of the methods in the above method embodiments.

It should be understood that the above processing apparatus may be one or more chips. For example, the processing device may be a field programmable gate array (FPGA), an application specific integrated circuit (ASIC), a system chip (SoC), a central processor unit (CPU), a network processor (NP), a digital signal processing circuit (DSP), a micro controller (MCU), a programmable logic device (PLD), or other integrated chips.

In an implementation process, each step in the above method may be completed by an integrated logic circuit of hardware or an instruction in the form of software in a processor. The steps of the methods disclosed in connection with embodiments of the present disclosure may be directly implemented by a hardware processor, or implemented by a combination of hardware and software modules in the processor. The software module may be located in a random access memory, flash memory, read-only memory, programmable read-only memory or electrically erasable programmable memory, registers, or other mature storage media, which are known in this field. The storage medium is located in the memory, and the processor reads information in the memory and completes the steps of the above methods in combination with its hardware. To avoid repetition, no detailed description is provided here.

It should be noted that the processor in embodiments of the present disclosure may be an integrated circuit chip with signal processing capabilities. In the implementation process, each step of the above-mentioned method embodiments may be completed by an integrated logic circuit in the hardware or instructions in the form of software in the processor. The above-mentioned processor may be a general-purpose processor, a digital signal processor (DSP), an application-specific integrated circuit (ASIC), a field-programmable gate array (FPGA) or other programmable logic devices, discrete gate or transistor logic devices, or discrete hardware components. The various methods, steps, and logic block diagrams disclosed in the embodiments of the present disclosure may be implemented or executed. A general-purpose processor may be a microprocessor, or the processor may be any conventional processor, or the like. The steps of the method disclosed in the embodiments of the present disclosure may be directly implemented by a hardware decoding processor, or implemented by a combination of hardware and software modules in the decoding processor. The software module can be located in a random access memory, flash memory, read-only memory, programmable read-only memory, electrically erasable programmable memory, registers, or other mature storage media, which are known in this field. The storage medium is located in the memory, and the processor reads information in the memory, and completes the steps of the above methods in combination with its hardware.

Based on the methods according to the embodiments of the present disclosure, the present disclosure also provides a computer program product. The computer program product includes computer program codes. When the computer program codes are executed by one or more processors, a device including the processor is enabled to execute the methods in the above embodiments.

According to the method according to the embodiments of the present disclosure, the present disclosure also provides a computer-readable storage medium. The computer-readable storage medium stores program codes. When the program codes are run by one or more processors, a device including the processor is enabled to execute the methods in the above-mentioned embodiment.

According to the method according to the embodiments of the present disclosure, the present disclosure further provides a system. The system includes the aforementioned one or more network devices. The system may further include the aforementioned one or more terminal devices.

In the several embodiments according to the present disclosure, it should be understood that the disclosed devices and methods may be implemented in other ways. For example, the device embodiments described above are only illustrative. For example, the division of the modules is only a logical function division. In actual implementation, there may be other division methods. For example, multiple modules may be combined or integrated into another system, or some features may be ignored, or not implemented. In another point, the mutual coupling or direct coupling or communication connection shown or discussed may be indirect coupling or communication connection of modules through some interfaces, and may be in electrical, mechanical or other forms.

The above are only specific embodiments of the present disclosure, but the protection scope of the present disclosure is not limited thereto. Changes or substitutions within the technical scope disclosed in the present disclosure that are easily conceivable by anyone skilled in the art should be covered within the protection scope of the present disclosure. Therefore, the protection scope of the present disclosure should be determined by the protection scope of the claims.

What is claimed is:

1. A communication method, comprising:

sending, by a terminal device, request information to a network device, wherein the request information is configured to indicate a first transmission requirement, and the request information is access stratum information;

wherein the method further comprises:

receiving, by the terminal device, first response information from the network device, wherein the first response information is configured to configure a first transmission resource or to confirm that the first transmission resource is configured for transmission data, and the first transmission resource is a transmission resource that meets the first transmission requirement;

sending, by the terminal device, second indication information to the network device, wherein the second indication information is configured to indicate capability information of the terminal device or indicate that the terminal device is of a target type, and the second indication information comprises one or more of:

information that the terminal device supports transmission of training data, information that the terminal device supports collection of training data, information that the terminal device is of an artificial intelligence type, and information that the terminal device supports a target agent; and receiving, by the terminal device, configuration information from the network device, wherein the configuration information is configured to configure a resource bearing the request information.

2. The method according to claim 1, further comprising:

receiving, by the terminal device, first indication information from the network device, wherein the first indication information is configured to indicate a first corresponding relationship between at least one transmission requirement and at least one transmission resource, and determining, by the terminal device, the first transmission requirement from the at least one transmission requirement, wherein a transmission resource corresponding to the first transmission requirement in the at least one transmission resource is the first transmission resource.

3. The method according to claim 2, wherein the first indication information is dedicated information of the terminal device, public information, or dedicated information of a group of terminal devices, wherein the group of terminal devices comprises the terminal device.

4. The method according to claim 2, wherein the request information is configured to request that the first transmission resource corresponding to the first transmission requirement is configured for transmission data.

5. The method according to claim 2, wherein the first transmission resource is a dynamic grant resource, a configuration grant resource, an aperiodic resource, a periodic resource, or a semi-persistent resource.

6. The method according to claim 1, wherein the first transmission requirement is configured to configure, adjust or indicate at least one of:

a parameter of a radio bearer, a rate of a data radio bearer (DRB), DRB reliability, a transmission parameter, a parameter of QoS, a parameter of a logical channel, a transmission delay, and the first transmission resource.

7. The method according to claim 1, wherein the first transmission requirement corresponds to QoS of a non-access stratum, or the first transmission requirement is a transmission requirement of the access stratum.

8. The method according to claim 1, wherein the first transmission requirement corresponds to a requirement of a radio resource bearer, a requirement of a protocol data unit (PDU) session, a requirement of a QoS flow, or a transmission requirement of the terminal device.

9. The method according to claim 1, wherein the request information is carried in at least one of an RRC message, a MAC CE, and a physical layer signaling; and/or the request information is one of assistance information of the terminal device, a measurement report, a scheduling request (SR) message, a random access message, and dedicated information for requesting a transmission resource.

10. The method according to claim 1, wherein the request information comprises one or more indication information for requesting to change a transmission requirement, the first transmission requirement, identification information of the first transmission requirement, a requirement or configuration information of the first transmission resource, identification information of the first transmission resource, a value of a transmission parameter, a value range of the transmission parameter, and level information of the transmission parameter, wherein the first transmission resource is a resource that meets the first transmission requirement, and the transmission parameter comprises one or more of:

a rate of a data radio bearer (DRB), DRB reliability, and a transmission delay.

11. The method according to claim 10, wherein the level information of the transmission parameter has a second corresponding relationship with one or more of one value of the transmission parameter, one value range of the transmission parameter, the first transmission resource, and the identification information of the first transmission resource; or the value of the transmission parameter or the value range of the transmission parameter have a third corresponding relationship with one or more of the first transmission resource and the identification information of the first transmission resource;

wherein the second corresponding relationship and/or the third corresponding relationship are defined by a protocol, pre-configured by the network device, or pre-configured by a core-network device.

12. The method according to claim 1, wherein the request information is configured to request a temporary resource, and the first transmission resource is valid for a first time interval, or wherein the first transmission requirement is a temporary requirement, and the first transmission requirement is valid for a second time interval;

wherein the request information comprises the first time interval or the second time interval, or the first time interval or the second time interval is preconfigured by a core-network device, or the first time interval or the second time interval is preconfigured by the network device.

13. The method according to claim 1, wherein the sending, by the terminal device, the request information to the network device, comprising:

sending, by the terminal device, the request information to the network device in response to a trigger condition being met, wherein the trigger condition comprises one or more of:

a current transmission resource not meeting the first transmission requirement, a target object not supporting transmission of group data or training data, a variation of a transmission requirement being greater than or equal to a threshold value, and a third indication information being received, wherein the target object is an application layer, an agent, or a target cell, and the third indication information is configured to indicate change of the agent.

14. The method according to claim 1, wherein before the sending, by the terminal device, the request information to the network device, the method further comprises:

receiving, by the terminal device, fourth indication information from the network device, wherein the fourth indication information is configured to indicate that the terminal device is allowed or enabled to send the request information.

15. The method according to claim 14, wherein the fourth indication information comprises a third time interval, and the third time interval is a minimum time interval for which the terminal device sends the request information for indicating the first transmission requirement.

16. The method according to claim 1, wherein the first transmission requirement is an uplink transmission requirement, and the first transmission resource corresponding to the first transmission requirement is an uplink transmission resource; or the first transmission requirement is a downlink transmission requirement, and the first transmission resource corresponding to the first transmission requirement is a downlink transmission resource.

17. A communication device, comprising a processor, a memory, and a communication interface communicated with a network device;

wherein the memory stores computer-executable instructions, when executed by the processor, causing the processor to execute:

sending request information to the network device through the communication interface, wherein the request information is configured to indicate a first transmission requirement, and the request information is access stratum information;

wherein when executed by the processor, causing the processor to further execute:

receiving first response information from the network device, wherein the first response information is configured to configure a first transmission resource or to confirm that the first transmission resource is configured for transmission data, and the first transmission resource is a transmission resource that meets the first transmission requirement;

sending second indication information to the network device, wherein the second indication information is configured to indicate capability information of a terminal device or indicate that the terminal device is of a target type, and the second indication information comprises one or more of:

information that the terminal device supports transmission of training data, information that the terminal device supports collection of training data, information that the terminal device is of an artificial intelligence type, and information that the terminal device supports a target agent; and receiving configuration information from the network device, wherein the configuration information is configured to configure a resource bearing the request information.

18. The communication device according to claim 17, wherein when executed by the processor, causing the processor to further execute:

receiving first indication information from the network device, wherein the first indication information is configured to indicate a first corresponding relationship between at least one transmission requirement and at least one transmission resource, and determining the first transmission requirement from the at least one transmission requirement;

wherein a transmission resource corresponding to the first transmission requirement in the at least one transmission resource is the first transmission resource.

19. A non-transitory computer-readable storage medium, comprising a computer program, when executed by one or more processors, causing an apparatus comprising the one or more processors to perform:

sending request information to a network device through a communication interface, wherein the request information is configured to indicate a first transmission requirement, and the request information is access stratum information;

wherein when executed by one or more processors, causing the apparatus comprising the one or more processors to further perform:

receiving first response information from the network device, wherein the first response information is configured to configure a first transmission resource or to confirm that the first transmission resource is configured for transmission data, and the first transmission resource is a transmission resource that meets the first transmission requirement;

sending second indication information to the network device, wherein the second indication information is configured to indicate capability information of a terminal device or indicate that the terminal device is of a target type, and the second indication information comprises one or more of:

information that the terminal device supports transmission of training data, information that the terminal device supports collection of training data, information that the terminal device is of an artificial intelligence type, and information that the terminal device supports a target agent; and receiving configuration information from the network device, wherein the configuration information is configured to configure a resource bearing the request information.

20. The non-transitory computer-readable storage medium according to claim 19, wherein when executed by one or more processors, causing the apparatus comprising the one or more processors to further perform:

receiving first indication information from the network device, wherein the first indication information is configured to indicate a first corresponding relationship between at least one transmission requirement and at least one transmission resource, and determining the first transmission requirement from the at least one transmission requirement;

wherein a transmission resource corresponding to the first transmission requirement in the at least one transmission resource is the first transmission resource.

* * * * *